United States Patent Office 3,634,277
Patented Jan. 11, 1972

3,634,277
STABILIZED TETRAHYDROFURAN SOLUTIONS OF DIBORANE
Herbert C. Brown, 1840 Garden St.,
West Lafayette, Ind. 47906
No Drawing. Filed Mar. 20, 1969, Ser. No. 809,015
Int. Cl. C01b 35/00
U.S. Cl. 252—188      14 Claims

ABSTRACT OF THE DISCLOSURE

Solutions of diborane in tetrahydrofuran can be prepared without handling the gas by treating suspensions of sodium borohydride in tetrahydrofuran with boron trifluoride, followed by decanting, filtering, or centrifuging the tetrahydrofuran solution of diborane from the precipitated sodium fluoborate. Such solutions are normally unstable at ordinary temperatures, undergoing reductive cleavage of the solvent. Consequently, they cannot be stored for any appreciable time or shipped any appreciable distance. However, these solutions are stabilized toward such reductive cleavage by utilizing in the synthesis a slight excess of sodium borohydride or other ionic borohydrides. These discoveries now make practical the manufacture, shipping, storing and application of such solutions of diborane in tetrahydrofuran, highly useful for hydroborations and hydrogenations.

BACKGROUND

(I) Field of invention

This invention relates to a novel process for preparing solutions of diborane in tetrahydrofuran without the independent preparation of handling of gaseous diborane. It also relates to a completely novel means of stabilizing such solutions toward reductive cleavage by utilizing a small excess of sodium borohydride or other ionic borohydrides. It also describes as a novel composition of matter solutions of diborane in tetrahydrofuran containing dissolved sodium borohydride or other ionic borohydride. These discoveries make it practical for the first time to manufacture solutions of diborane in tetrahydrofuran capable of being stored, shipped and used without special refrigeration or other special precautions.

(II) Description of the prior art

Diborane, $B_2H_6$, is a chemical with remarkable properties. It reacts instantly with olefins in the presence of ethers, such as tetrahydrofuran, to form organoboranes.

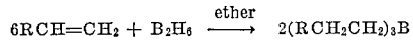

This process is known as "hydroboration," and is fully described in my patent (H. C. Brown, U.S. 3,078,311, Feb. 19, 1963) and in my book (H. C. Brown, Hydroboration, W. A. Benjamin Co., New York, 1962).

Diborane is also an exceedingly powerful, but selective hydrogenating agent for functional groups. Whereas sodium borohydride is a basic-type reducing agent (H. I. Schlesinger and H. C. Brown, U.S. 2,683,721, July 13, 1954), diborane is an acidic-type reducing agent (H. C. Brown and B. C. Subba Rao, J. Am. Chem. Soc., 82, 681 (1960)). The availability of both an acidic and a basic-type reducing agent makes possible numerous selective reductions or hydrogenations of functional groups (H. C. Brown, Hydroboration, W. A. Benjamin Co., New York, 1962, Chapter 17).

Sodium borohydride is crystalline solid, a stable reagent, easily manufactured, stored, shipped and used. However, diborane is a gas, B.P.—92.5° C. It is highly reactive towards air and moisture. Consequently, it is difficult to handle. Although attempts have been made to compress it in tanks for shipment, this practice involves major difficulty. Diborane in contact with the metal of the cylinders or tanks decomposes spontaneously into hydrogen and higher hydrides of diborane. Indeed, it is recommended that such cylinders be refrigerated and shipped or stored at low temperatures.

A desirable solution to these difficulties would be to dissolve diborane into a suitable solvent and to ship the material in that form. Unfortunately, the gas does not possess adequate solubility in hydrocarbon solvents. It cannot be stored in such solvents as esters, dimethyl sulfoxide, or dimethylformamide, since these undergo relatively rapid reduction. Diborane reacts with amines to form relative stable amine-boranes, which fail to exhibit the desirable properties of diborane itself.

This leaves ethers as possible solvents.

Unfortunately, the solubility of diborane in representative ethers, such as diethyl ether, di-n-butyl ether, monoglyme (dimethyl ether of ethylene glycol), and diglyme (dimethyl ether of diethylene glycol), is far too low to permit preparation of solutions of high enough concentrations of diborane to be useful.

There is one exception known. Diborane is highly soluble in the cyclic ether, tetrahydrofuran (J. R. Elliott, W. L. Roth, G. F. Roedel and E. M. Boldebuck, J. Am. Chem. Soc., 74, 5211 (1952)). In this solvent it is possible to prepare solutions which are as concentrated as 4 molar in borane ($BH_3$), without exceeding one atmosphere of pressure. Moreover, we have observed that such solutions are relatively safe to use. They have been exposed to the atmosphere without observable change. They have been poured through the air without catching fire. They have been poured into evaporating dishes and allowed to evaporate, without catching fire.

Such solutions of diborane are ideal for hydroborations and selective hydrogenations. Consequently, it would be highly desirable to manufacture and ship such solutions of diborane in tetrahydrofuran.

Unfortunately, two major difficulties interfere.

In the past it has been customary to generate diborane by treating sodium borohydride in diglyme solution with boron trifluoride-etherate.

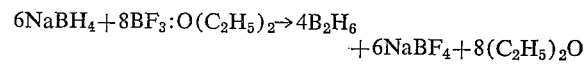

The diborane gas is then passed into the tetrahydrofuran solvent to make the solution.

This process requires the preparation and handling of large amounts of diborane, an exceedingly reactive and hazardous gas. This is the first of the major difficulties.

The second of the major difficulties arises from the observation that solutions of diborane in tetrahydrofuran have a highly limited shelf-life at ordinary temperatures. Such solutions undergo reductive cleavage of the tetrahydrofuran by the diborane (J. Kollonitsch, J. Am. Chem. Soc., 83, 1515 (1961)).

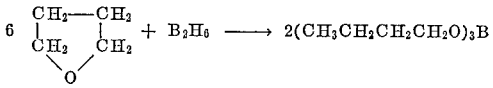

Such solutions lose 1 to 3% of the available diborane per day at ordinary temperatures (25 to 30°). Consequently, it is impractical to manufacture, store, and ship such solutions.

The present invention solves these problems.

SUMMARY

Treatment of a suspension of sodium borohydride in tetrahydrofuran with boron trifluoride converts the sodium borohydride into diborane, which remains in solution, and sodium fluoborate, which precipitates. The resulting solution of diborane in tetrahydrofuran can be decanted from the sodium floroborate. Alternatively, this salt, which is essentially insoluble in the solvent, can be removed by filtration of centrifugation.

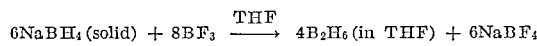

$$6NaBH_4 \text{(solid)} + 8BF_3 \xrightarrow{THF} 4B_2H_6 \text{(in THF)} + 6NaBF_4$$

This reaction can be carried out on a large scale and does not involve any handling of gaseous diborane.

We discovered that the use of a slight excess of sodium borohydride in this process gives solutions which exhibit far higher stability toward reductive cleavage of the solvent than solutions prepared by dissolving diborane in the solvent. This was a completely unexpected development. Research into this discovery revealed that the addition of small amounts of sodium borohydride to solutions of diborane in tetrahydrofuran greatly diminishes the reductive cleavage of the solvent, as shown by the data in Table I.

TABLE I.—STABILITY OF SOLUTIONS OF DIBORANE IN TETRAHYDROFURAN IN PRESENCE AND ABSENCE OF SODIUM BOROHYDRIDE AT 23°

| Time, weeks | Concentration of borane (no added sodium borohydride) | | Concentration of borane (in presence of 5% sodium borohydride) | |
|---|---|---|---|---|
| | M | Percent | M | Percent |
| 0 | 1.61 | 100 | 1.55 | 100 |
| 2 | 1.45 | 90 | 1.55 | 100 |
| 4 | 1.29 | 80 | 1.52 | 98 |
| 6 | 1.13 | 70 | 1.51 | 97 |
| 8 | 0.97 | 60 | 1.50 | 97 |

There is an obvious disadvantage in this procedure. The sodium borohydride is only slightly soluble in the tetrahydrofuran. Thus the addition of sodium borohydride in amounts of approximately 5 mole percent gives a heterogeneous mixture which can clog valves and constrictions in equipment through which it is pumped. In shipping such solutions in tank cars the solid sodium borohydride settles out and creates difficulties in cleaning such cars.

This problem can be solved by using the soluble lithium borohydride. Unfortunately, the lithium borohydride is far more costly than the sodium borohydride, so that the use of the lithium salt adds to the cost.

In part, this can be circumvented by adding small amounts of lithium hydride, lithium methoxide, or lithium tetramethoxyborohydride. Lithium borohydride is then generated in situ.

All of these additional operations add to the cost of the product.

We have discovered that stabilized solutions of diborane in tetrahydrofuran can be prepared merely by using a slight excess of sodium borohydride in the reaction with boron trifluoride. Filtration, centrifugation, or decantation removes the sodium fluoborate with the slight excess of sodium borohydride. Yet the clear solution of diborane in tetrahydrofuran exhibits high stability, as shown by the data in Table II.

TABLE II.—STABILITY OF SOLUTIONS OF DIBORANE IN TETRAHYDROFURAN PREPARED WITH THE USE OF SLIGHT EXCESS OF SODIUM BOROHYDRIDE

| Time, weeks | Concentration of borane | |
|---|---|---|
| | M | Percent |
| 0 | 1.58 | 100 |
| 1 | 1.58 | 100 |
| 2 | 1.58 | 100 |
| 3 | 1.57 | 99 |
| 4 | 1.55 | 98 |

These developments solve the two major problems previously outlined and make it practical to manufacture, ship, and store tetrahydrofuran solutions of diborane.

In the above process for manufacturing tetrahydrofuran solutions of diborane, it is possible to substitute other alkali metal borohydrides, such as potassium borohydride. However, sodium borohydride is the preferred embodiment of this invention.

The boron trifluoride can be utilized in the form of gaseous boron trifluoride. Alternatively, boron trifluoride can be added in the form of ethyl ether-boron trifluoride. This causes some diethyl ether to be present in the diborane solution. However, this has a serious disadvantage. The presence of the ethyl ether decreases the solubility of the diborane. It is more desirable to introduce the boron trifluoride by displacement.

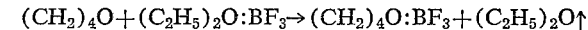

$$(CH_2)_4O + (C_2H_5)_2O{:}BF_3 \rightarrow (CH_2)_4O{:}BF_3 + (C_2H_5)_2O\uparrow$$

The volatile ethyl ether can be distilled out of the solution.

Sodium borohydride is our preferred stabilizer. It can be used in small quantities, from approximately 0.01 mole percent (based on borane) to approximately 10 mole percent, although the use of larger amounts of sodium borohydride has no deleterious effects. However, other stabilizers are also effective, such as potassium borohydride, lithium borohydride, rubidium borohydride, caesium borohydride, magnesium borohydride, calcium borohydride, and tetraethylammonium borohydride. It appears that the presence of ionic borohydride in small amounts is the effective stabilizer, so that any of these materials in small amounts is effective.

Although we prefer to introduce the sodium borohydride by using a small excess during the preparation of the solution, or by adding solid sodium borohydride to the solution, it is possible to generate the sodium borohydride in situ by adding appropriate reagents which form sodium borohydride by reaction with diborane (H. C. Brown, Hydroboration, W. A. Benjamin Co., New York, 1962, Chapter 4). Thus the addition of small amounts of finely divided sodium hydride serves satisfactorily.

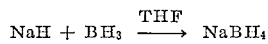

$$NaH + BH_3 \xrightarrow{THF} NaBH_4$$

Alternatively, sodium methoxide or other alkoxide can be used.

$$3NaOCH_3 + 4BH_3 \xrightarrow{THF} 3NaBH_4 + B(OCH_3)_3$$

Similarly, sodium trimethoxyborohydride or sodium tetramethoxyborohydride can be used.

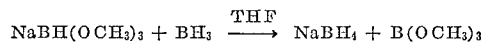

$$NaBH(OCH_3)_3 + BH_3 \xrightarrow{THF} NaBH_4 + B(OCH_3)_3$$

In the same way, any of the ionic borohydrides can be synthesized in situ to provide the stabilizer.

These relatively concentrated solutions of diborane in tetrahydrofuran containing small amounts of dissolved sodium borohydride or other ionic borohydrides as stabilizers constitute a new composition of matter with unexpected properties of major importance—high stability toward reductive cleavage of the solvent.

DESCRIPTION OF THE PREFERRED EMBODIMENTS

Example 1

In a two liter flask flushed with nitrogen was placed 0.80 liter of dry tetrahydrofuran. Sodium borohydride, 57 g. (1.5 moles), was added and the mixture was vigorously stirred to keep the salt in solution. Two moles of ethyl ether-boron trifluoride was added slowly to the well-stirred solution cooled in a water bath to maintain the temperature at 25° or lower. After all of the etherate had been added, the solution was stirred for an additional hour. A filter stick was then introduced and the solution pushed through the filter stick by nitrogen pressure into the storage bottle. A small amount of tetrahydrofuran was added to make the total volume 1.0 liter. The yield was almost quantitative, the solution (1.0 liter) analyzing 1.96 M in borane.

This solution was not stable to reductive cleavage, but underwent a loss of approximately 2% of active hydrogen per day.

The use of excess sodium borohydride gave a stabler solution, as shown in Example 2.

Example 2

The procedure of Example 1 was duplicated, but an excess of sodium borohydride was used, 60 grams, instead of the theoretical quantity of 57 grams used in Example 1. The solution contained nearly 2 moles of borane, 1.98 M. This solution was much more stable to reductive cleavage, undergoing no obervable change in two weeks at 25°.

Example 3

The procedure of Example 1 was repeated. The solution was divided into two equal portions. To one solution was added 5 mole percent of sodium borohydride. The borohydride is only slightly soluble in the solution, but the suspension is entirely adequate. The two solutions were allowed to stand at room temperature under nitrogen. At regular intervals, aliquots were removed and analyzed for active hydrogen by reaction with water-glycerol mixtures. The unstabilized solution lost 20% of its active hydrogen in 4 weeks. The sodium borohydride stabilized solution showed only 2% loss over the same period of time.

The detailed data are summarized in Table I.

Similar results are realized with 0.1 mole percent of sodium borohydride, 1% of sodium borohydride, and 10% of sodium borohydride. Consequently, the precise amount of sodium borohydride is not of major importance.

The addition of lithium borohydride, potassium borohydride, tetramethylammonium borohydride and other ionic borohydrides likewise stabilizes such solutions of diborane in tetrahydrofuran.

Example 4

A 2.0 M solution of borane in tetrahydrofuran was prepared as described in Example 1. To one liter of the 1.96 M solution was added 0.06 moles of sodium tetramethoxyborohydride. There occurs an immediate formation and precipitation of sodium borohydride. The resulting solution exhibits no measurable change

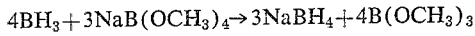

in active hydride over four weeks.

Similarly, sodium hydride or sodium methoxide can be added to form sodium borohydride in situ.

Example 5

The sodium borohydride was the commercial product (Ventron Corporation, >98%) and was used as such. Tetrahydrofuran was dried and distilled over lithium aluminum hydride. Boron trifluoride-tetrahydrofuranate was prepared as follows.

To a freshly distilled boron trifluoride-etherate (242 g., 2 moles), 152 g. of tetrahydrofuran (2.1 moles) was added in a 1-liter flask. The ether was removed under vacuum at 25° until the weight of the contents of the flask had dropped to a constant value, 280 g. The boron trifluoride-tetrahydrofuranate was distilled, BP 79–80° at 10 mm., $d^{52}$ 1.25. (This distillation step is not necessary.)

A 2-liter flask, oven-dried and cooled under nitrogen, equipped with a magnetic stirrer, inlet tube capped with a rubber septum, and a reflux condenser connected to a mercury bubbler, was placed in a cold-water bath. To the flask was added 60 g. of sodium borohydride (5% excess) and then 1 liter of tetrahydrofuran was introduced. To the stirred slurry was added 281 g. (2.0 moles) of boron trifluoride-tetrahydrofuranate as the temperature was maintained at 10–15°. The slurry was allowed to settle overnight, yielding a clear solution. The concentration of the clear solution was 1.58 M in borane ($BH_3$), as compared to a calculated concentration of 1.63 M. Therefore the yield was approximately 97%. The solution was allowed to stand at room temperature and aliquots removed at regular intervals and analyzed for active hydrogen. Over 4 weeks, the concentration had dropped to 1.55 M, a decrease of only 2% (Table II). This compares to a decrease of 20% exhibited by a solution prepared without an excess of sodium borohydride.

Having thus described the general nature and specific embodiments of the present invention, the true scope of the invention is now pointed out in the appended claims.

I claim:

1. A process for the preparation of stabilized solutions of diborane in tetrahydrofuran which comprises contacting a suspension in tetrahydrofuran containing from 0.01 mole percent to about 50 mole percent excess of a borohydride selected from the group consisting of sodium borohydride, potassium borohydride with boron trifluoride and separating the solution of diborane from the precipitated alkali metal fluoroborate and undissolved borohydride.

2. The process as claimed by claim 1 wherein the boron trifluoride is introduced as a gas.

3. The process as claimed by claim 1 wherein the boron trifluoride is introduced as an etherate.

4. The process as claimed by claim 3 wherein the etherate is ethyl ether-boron trifluoride.

5. The process as claimed by claim 3 wherein the etherate is tetrahydrofuran-boron trifluoride.

6. The process of stabilizing clear solutions of diborane in tetrahydrofuran which comprises adding to the solution an amount of an ionic borohydride slightly less than the amount required to saturate the solution, said ionic borohydride being selected from the group consisting of sodium, potassium, lithium, rubidium, caesium, magnesium, calcium and tetraethylammonium borohydrides.

7. The process as claimed by claim 6 wherein the ionic borohydride is selected from the group consisting of sodium borohydride and potassium borohydride.

8. A composition produced by the process as claimed by claim 6.

9. A process for the preparation of solutions of diborane in tetrahydrofuran which comprises contacting a suspension of a borohydride in tetrahydrofuran selected from the group consisting of sodium borohydride and potassium borohydride with slightly less than the stoichiometric quantity of boron trifluoride, and separating the solution of diborane from the precipitated alkali metal fluoroborate and the excess of borohydride.

10. The process as claimed by claim 9 wheerin the boron trifluoride is introduced as a gas.

11. The process as claimed by claim 9 wherein the boron trifluoride is introduced as an etherate.

12. The process as claimed by claim 11 wherein the etherate is ethyl ether-boron trifluoride.

13. The process as claimed by claim 11 wherein the etherate is tetrahydrofuran-boron trifluoride.

14. A composition produced by the process as claimed by claim 1.

References Cited

UNITED STATES PATENTS 3,078,309   2/1963   Brown _____ 260—462 R
3,078,311   2/1963   Brown _____ 260—606.5 B RICHARD D. LOVERING, Primary Examiner I. GLUCK, Assistant Examiner U.S. Cl. X.R.

23—59, 149; 149—22; 252—105; 260—462 R, 606.5 B